United States Patent
Roddy et al.

(10) Patent No.: US 9,085,916 B2
(45) Date of Patent: Jul. 21, 2015

(54) APPARATUS FOR ALIGNMENT AND SUPPORT OF FENCE RAILS

(71) Applicants: Jeffrey H Roddy, Richardson, TX (US); Kenneth J Roddy, Garland, TX (US)

(72) Inventors: Jeffrey H Roddy, Richardson, TX (US); Kenneth J Roddy, Garland, TX (US)

( * ) Notice: Subject to any disclaimer, the term of this patent is extended or adjusted under 35 U.S.C. 154(b) by 0 days.

(21) Appl. No.: 13/936,185

(22) Filed: Jul. 6, 2013

(65) Prior Publication Data
US 2015/0008384 A1 Jan. 8, 2015

(51) Int. Cl.
*E04H 17/26* (2006.01)
*E04H 17/14* (2006.01)
*F16B 2/22* (2006.01)

(52) U.S. Cl.
CPC ............ *E04H 17/26* (2013.01); *E04H 17/1421* (2013.01); *F16B 2/22* (2013.01); *E04H 2017/1473* (2013.01); *Y10T 29/53* (2015.01)

(58) Field of Classification Search
CPC . E04H 17/1413; E04H 17/14; E04H 17/1417; E04H 17/1421; E04H 17/26; E04H 2017/146; E04H 2017/1473; F16B 2/22; F16B 2/245
USPC ...................... 403/193, 282; 269/36, 74, 309; 256/65.01, 65.02, 65.03, 65.07; 182/113; 52/DIG. 12; 29/700, 29/243.5–243.58; 248/74.2, 581
See application file for complete search history.

(56) References Cited

U.S. PATENT DOCUMENTS

| | | | | |
|---|---|---|---|---|
| 1,515,831 A | * | 11/1924 | Bush | 248/230.8 |
| 3,524,627 A | * | 8/1970 | Boyanton et al. | 256/65.06 |
| 4,211,381 A | * | 7/1980 | Heard | 248/230.8 |
| 4,214,841 A | * | 7/1980 | Hayashi | 403/188 |
| D413,769 S | * | 9/1999 | Mason | D7/620 |
| 6,460,813 B1 | * | 10/2002 | Gretz | 248/62 |
| 6,622,976 B1 | * | 9/2003 | Ianello | 248/73 |
| 7,284,746 B2 | * | 10/2007 | Kuenzel | 256/65.14 |
| 7,641,156 B2 | * | 1/2010 | Medders et al. | 248/125.8 |
| D613,921 S | * | 4/2010 | Tsui et al. | D32/52 |
| 7,905,037 B1 | * | 3/2011 | Holland et al. | 40/310 |
| 7,942,385 B2 | * | 5/2011 | Begin | 256/65.14 |
| 8,662,455 B2 | * | 3/2014 | Hernandez et al. | 248/73 |
| D720,612 S | * | 1/2015 | Gilbert et al. | D8/394 |
| 2004/0200936 A1 | * | 10/2004 | Opperthauser | 248/62 |
| 2010/0288992 A1 | * | 11/2010 | Gray | 256/65.03 |
| 2011/0297481 A1 | * | 12/2011 | Copus | 182/113 |

OTHER PUBLICATIONS

"Compressible." Dictionary.com. [online], [retrieved on May 8, 2014]. Retrieved from the Internet <URL: http://dictionary.reference.com/browse/compressible>.*

* cited by examiner

*Primary Examiner* — Josh Skroupa
(74) *Attorney, Agent, or Firm* — Jeffrey Roddy

(57) ABSTRACT

A visualization, alignment and support tool permitting one person fence rail installation, and greatly speeding the installation when more than two persons are employed. Specifically, the tool temporarily affixes to a fence pipe and offers support for a length of fence rail; especially the ends of adjacent fence rails, so that the rails are supported and level relative to a fence pipe bracket which is fastened to the fence pipe. The rail ends can then be fastened with screws or other fasteners to the fence pipe bracket when desired without further adjustment required.

4 Claims, 5 Drawing Sheets

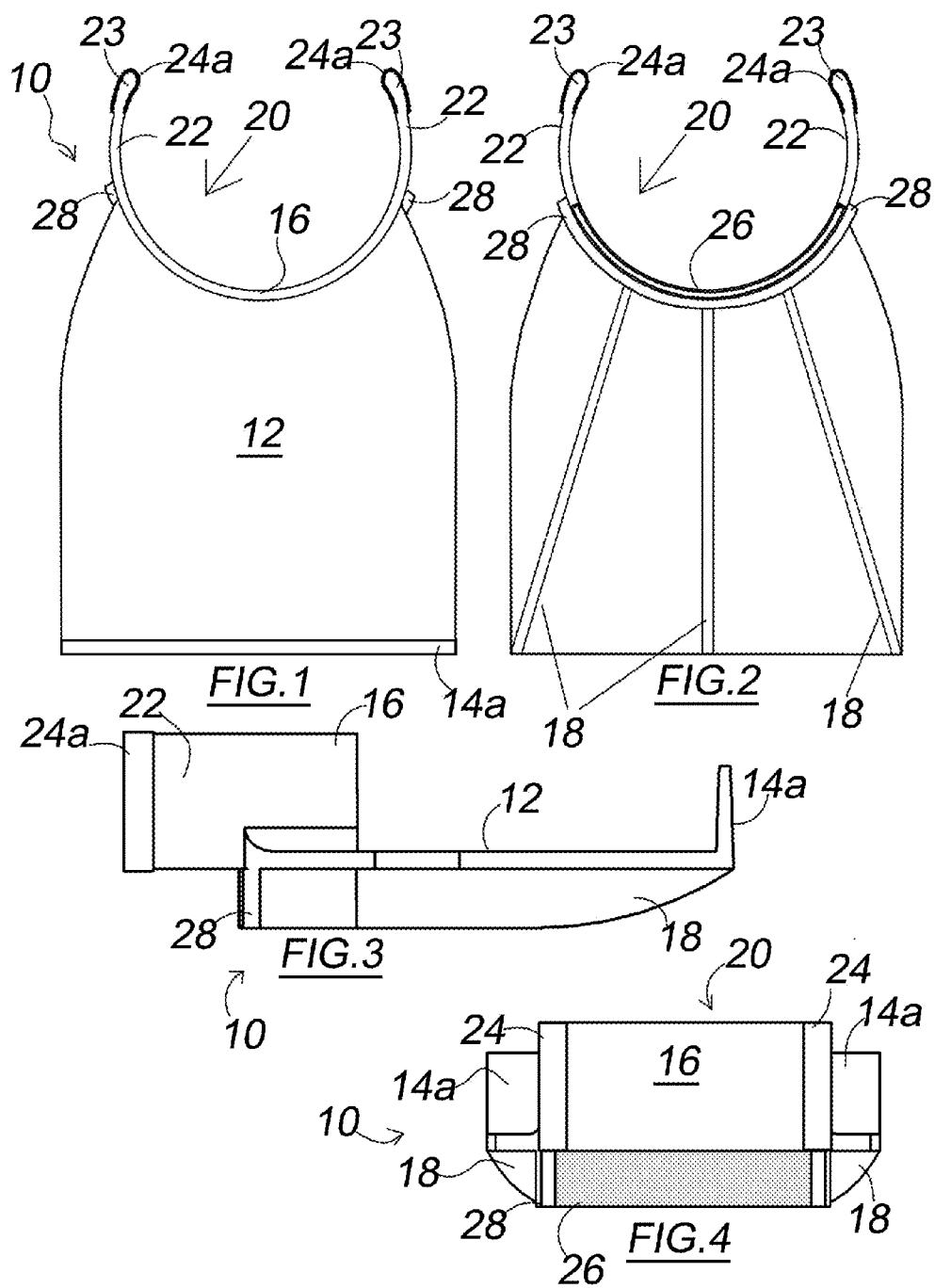

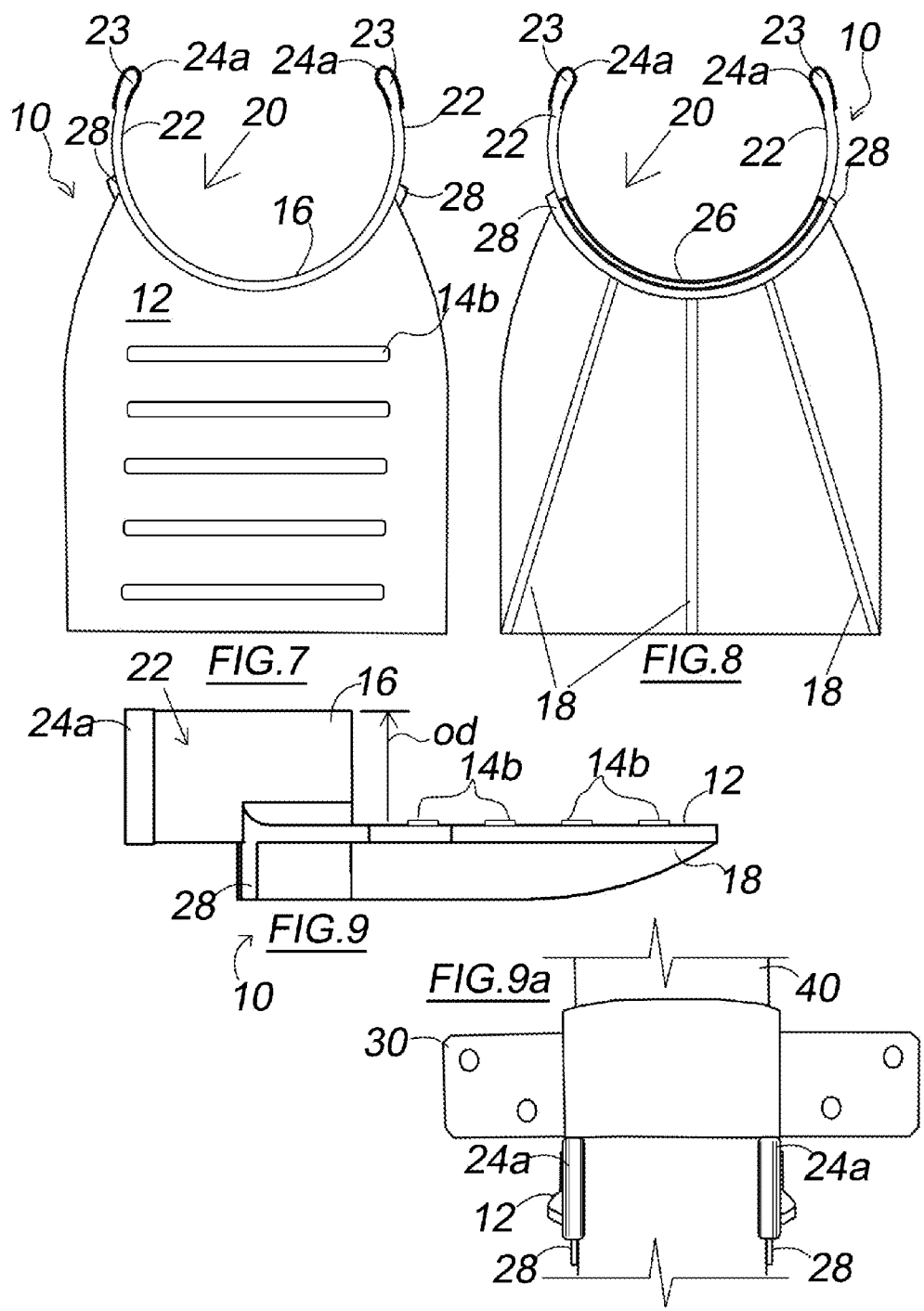

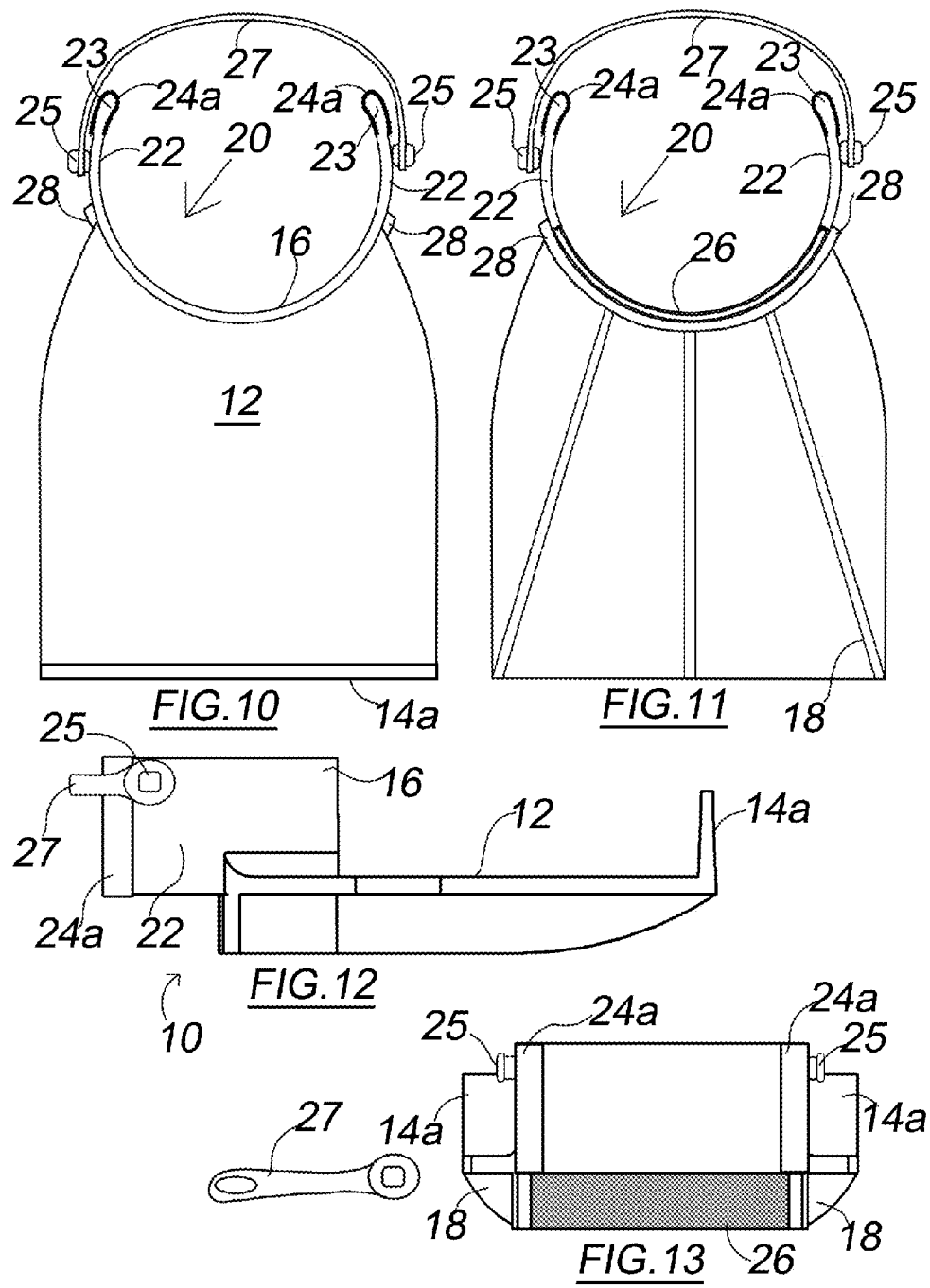

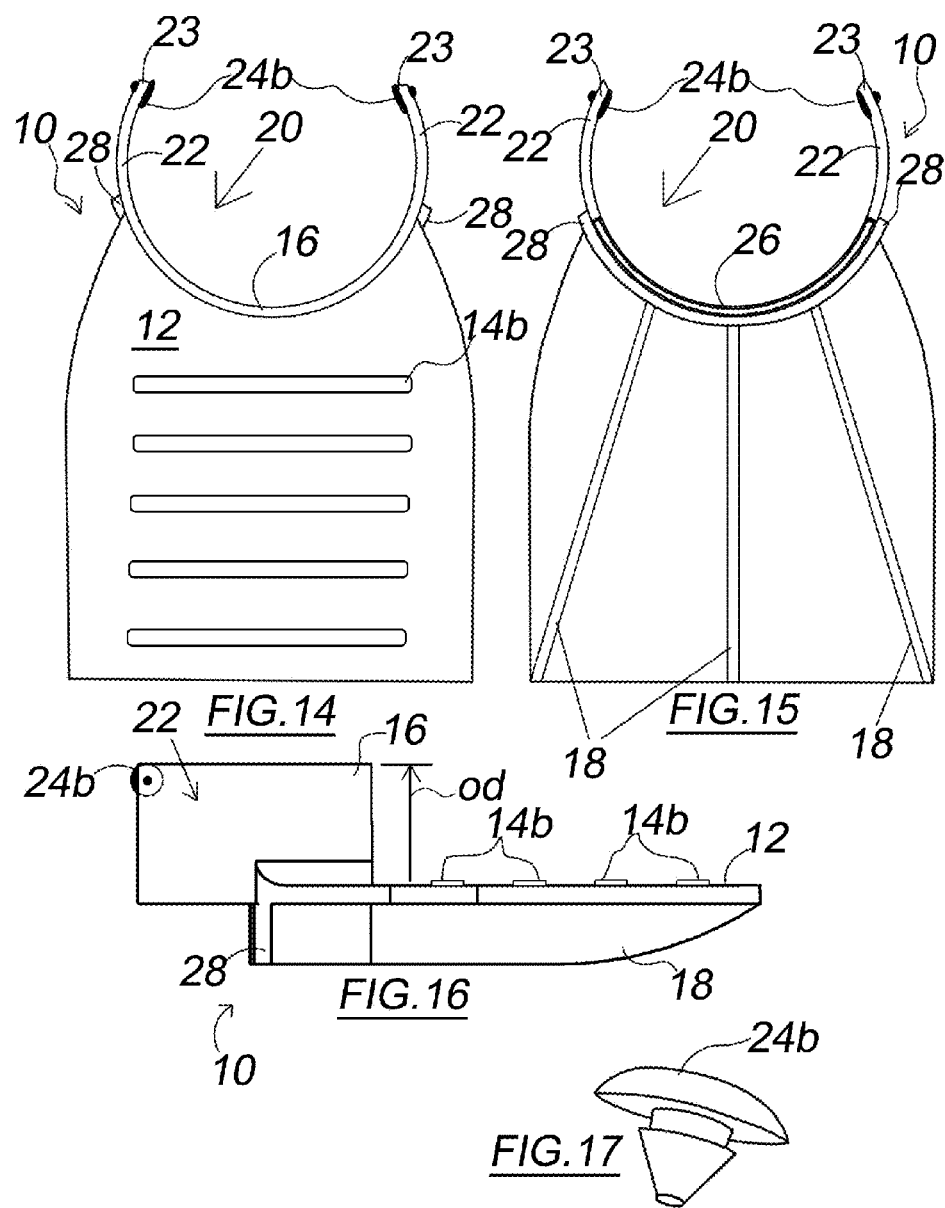

APPARATUS FOR ALIGNMENT AND SUPPORT OF FENCE RAILS

FIELD OF THE INVENTION

This invention relates to the temporary support of a fence rail prior to the rail's attachment to a post bracket, especially for custom wooden fence construction.

BACKGROUND OF THE INVENTION

Natural wood rail and post fencing is the most common type of fence in the United States. Many consider this type of fencing to be more attractive than hurricane type fencing because it combines the strength and durability of metal posts or pipe with the privacy of a wooden pickets and can be painted or stained to suit the owner's preferences. In rail and pipe construction, posts of galvanized pipe are connected to horizontal wooden rails by a fence pipe bracket that is affixed to the fence pipe. There are several manufacturers of pipe brackets. These brackets have a semi-circular portion that engages a fence pipe and possess a pair of adjacent flanges for the attachment of rail ends.

Fence pipe brackets are typically installed 3 to a pipe for a fence having a height of 6 feet and 4 to a pipe for an 8 foot high fence. Each pipe bracket is leveled with respect to a corresponding pipe bracket on an adjacent post. Leveling of the pipe brackets is done by string line or laser level and is an important determinant of fence quality. The last 3 or 4 inches of each rail are fastened by screws to a flange of the pipe bracket, and ideally abuts the end of an adjacent rail that is fastened to the other flange or attachment point of the pipe bracket. In this manner a continuous progression of rails down the fence line is established. Typically, two people are required to attach each rail, with one individual tasked to affixing the rail end to the pipe bracket, while another individual supports the rail in a level orientation; usually in the middle of the rail or at the opposite end of the rail. While rails are often immobilized by applying the weight of the body against the rail to bring the flats of the rail ends in contact with the post bracket flanges, it is not uncommon for the individual supporting the fence rail to move slightly which necessitates repeat leveling of the rail. It would be desirable to have a tool that permits easy leveling of the rails by providing support and retention means as well as means to center the rail relative to the bracket, so that one individual alone can perform the rail installation.

SUMMARY OF THE INVENTION

The present invention includes an apparatus which reduces by at least half—the number of persons required for other rail attachment methods, and greatly speeds fence construction. The apparatus affixes temporarily to the post just beneath a pipe bracket and offers support for the ends of fence rails so that the rails are supported and level relative to the fence bracket.

The apparatus includes at least a platform having an opening which is attachable about a fence pipe and retains its position on the fence pipe by friction, tension and cantilevering. The apparatus is light weight and easy to install and remove with one handed operation, and provides a level surface for a rail edge to rest upon so that the flats of the rail end are proximal to the fence pipe bracket flange for fastening thereto. The apparatus includes a gauging means for setting the distance from the fence bracket to the platform to maintain consistent alignment and centering of the rails relative to the pipe bracket flanges, which can be fixed or adjustable.

A single apparatus may be used as an extra set of hands or even more advantageously used in multiples, with rails placed between each member of a pair.

The platform of the apparatus is made of any material capable of supporting at least one-half the weight of a common 2×4×8 fence rail; typically anywhere from 5 to 8 lbs. Among suitable materials are stamped sheet metal, heat formed or molded plastic, die-cast metal or any combination of the foregoing. Whatever the materials of construction, the opening is shaped to receive a section of fence pipe, and possesses portion which partially surround and contact the pipe.

The platform of the apparatus remains in position on the fence pipe primarily due to at least a pair of resilient arms forming the sides of the opening which are generally arc-shaped and shaped to snugly contact a portion of the nominal 2.38 inch diameter fence pipe. The resilient arms have ends 23 with portions that protrude slightly into the otherwise consistent radius of the opening. Preferably, the opening radius is 5-10 thousandths less than the smallest average radius of nominal 2.38 OD pipe which has been estimated to approximately 20-30 thousandths. Preferably, the arms are made of a resilient plastic that reversibly expand when placed over the pipe and have terminal compressible members with a A-shore value of 20-50. The compressible members initially compress during attachment to the pipe and then decompress once the ends are pushed just beyond the centerline of the pipe. In the embodiments herein, the compressible members come to rest no more than one inch beyond the centerline, and more preferably between 0.125 and 0.5 inch beyond the centerline. Frictional resistance to transverse and tilting movement is provided by compressible members 14a, 14b and a pivot point which corresponds to bottom contacting portion 28 of the platform, yielding a stable platform 12 capable of supporting at least 8 pounds in a position substantially perpendicular to a vertical fence pipe. The platform is easily raised or lowered while on the pipe, and is surprisingly easy to install and uninstall using only one hand. The compressible members, or any surface of the apparatus in direct contact with the pipe, can be of solid rubber such as neoprene bumpers, urethane or silicone sheet, or have a applied elastomeric coating to provide resistance to slippage. Other compressible elements engaging with the platform and reversibly abutting the sides of the fence pipe will suggest themselves to those having skill in the art and benefit of this disclosure.

While the platform opening will fit the majority of manufactured fence pipe, there may be cases where the fence pipe diameter falls below the typical tolerances. In such cases, a supplemental rubber strap is provided which can be attached to portions of the opening and which can be tensionably drawn over and against the exposed portion of a fence pipe to snug the fit.

Other advantages of the present invention will become apparent from the following descriptions, taken in connection with the accompanying drawings wherein by way of illustration and example, a preferred embodiment of the present invention is disclosed.

BRIEF DESCRIPTION OF THE DRAWINGS

FIG. 1 is a top plan view of a preferred embodiment according to the present invention;

FIG. 2 is a bottom plan view of the embodiment shown in (FIG. 1);

FIG. 3 is a side elevation of the embodiment of (FIG. 1);

FIG. 4 is a rear facing view of the embodiment of (FIG. 1);

FIG. 7 is a top plan view of one embodiment according to the present invention;

FIG. 8 is a bottom plan view of the embodiment of (FIG. 7);

FIG. 9 is a side elevation of the embodiment of (FIG. 7);

FIG. 9a is a rear facing view of a platform mounted to a fence pipe, and beneath a fence pipe bracket;

FIG. 10 is a top plan view of an embodiment according to the present invention;

FIG. 11 is a bottom plan view of the embodiment of (FIG. 10);

FIG. 12 is a side elevation of the embodiment of (FIG. 10);

FIG. 13 is a rear facing view of the embodiment of (FIG. 10);

FIG. 14 is a top plan view of an embodiment according to the present invention;

FIG. 15 is a bottom plan view of the embodiment of (FIG. 14);

FIG. 16 is a side elevation of the embodiment of (FIG. 14);

FIG. 17 is an enlarged view of a bumper 24b.

DETAILED DESCRIPTION OF THE INVENTION

Figure 5:
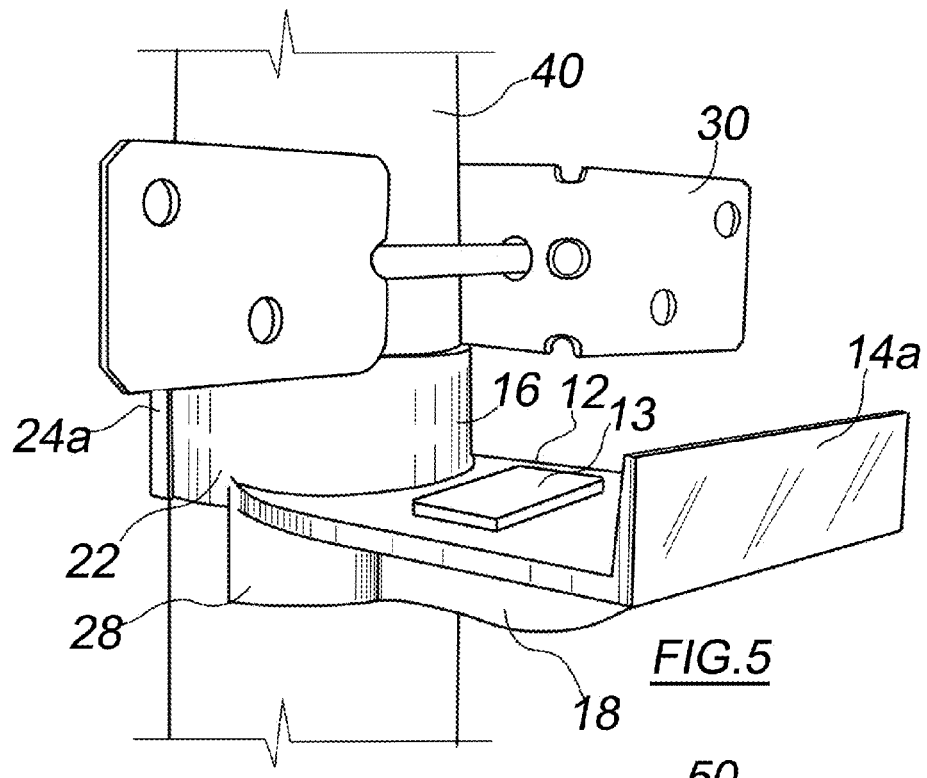
FIG. 5 is a perspective view showing the embodiment of (FIG. 1) affixed to a fence pipe

Reference Listing 10 rail support
12 platform
13 interchangeable offset
14a, 14b ridge
16 fixed offset
18 rib
20 opening
22 arm
23 arm end
24a, 24b compressible member
25 strap retention portion
26 rubber contact
27 strap
28 lower contacting portion
30 fence pipe bracket
40 fence pipe
50 rail

DEFINITIONS

In the following description, the term "platform" refers to any type of small platform capable of supporting an end of a fence rail which is easily and reversibly secured around a cylindrical pipe. For the purposes of this application, the term "fence pipe bracket" refers generally to the type of bracket which is the subject of U.S. Pat. No. 5,297,890 to Commins, which is currently marketed as the PGT® Pipe Grip Tie by Simpson Strong-Tie. Other similar fence post brackets marketed as OZ-Post™ brackets, fall under the same category. The term "fence pipe" or "fence post" as used herein is intended to refer to metal pipe-type fence posts. The terms "extending just beyond the centerline" or "slightly past the centerline" of a fence pipe means no more than an inch past the centerline of a nominal 2.38 inch fence pipe when the platform is mounted thereon. Unless otherwise explained, any technical terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Figure 6:
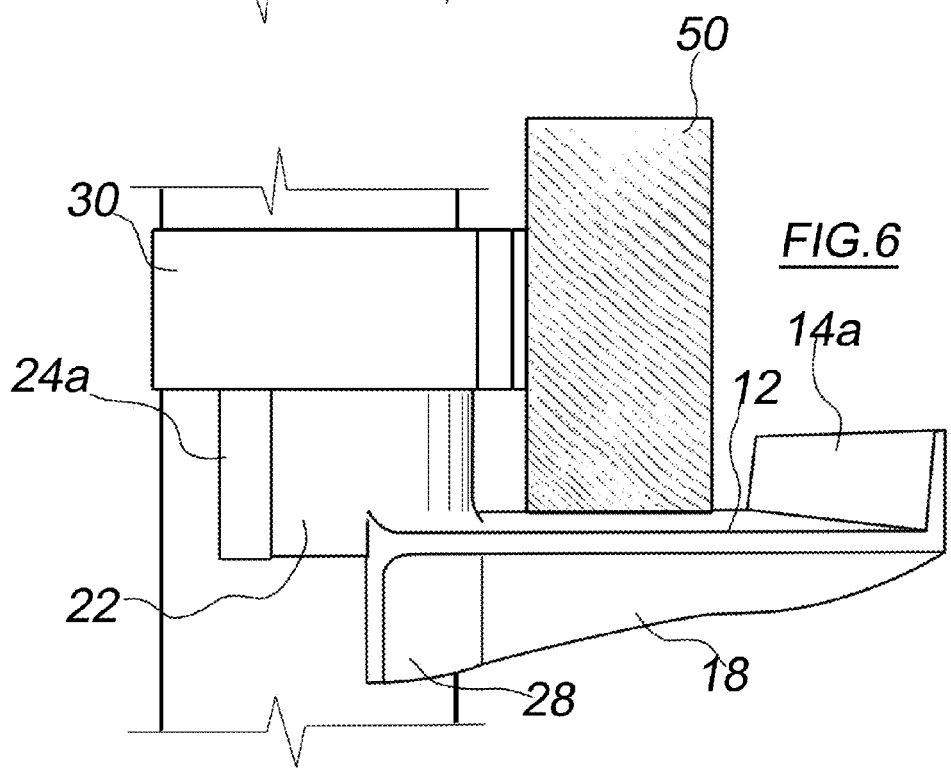
FIG. 6 is a side elevation of one embodiment according to the present invention affixed to a fence pipe.

Referring generally to FIGS. 1-16, a rail support 10 includes a platform 12 which is preferably an injection molded body with a pair of arms 22 forming an arc-shaped opening 20 which is shaped and sized to fit closely against a common 2.38 inch fence pipe 40, transverse the pipe, and support a portion of a fence rail 50 (FIG. 6). When the platform is installed on the pipe offset 16 is normally in contact with a bottom portion of the fence bracket 30 (see FIG. 5), and provides an means to correctly center the rail relative to fence pipe bracket flange (bf) for attachment, typically by lag screws. A lower contacting portion 28 is also in contact with the pipe surface and can be merely an extension of the arms 22, having the same radius, or, a different larger radius as shown, wherein a rubber member is fitted into an arc-shaped recess. Preferably, rubber member 26 would be selected for a thickness that would, when affixed, by gluing or otherwise to the inner side of lower contacting portion 28, protrude sufficiently to slightly upwardly tilt an installed, but as yet unloaded platform approximately 5 degrees from level. When the platform is loaded, rubber member 26 is forced against the pipe to prevent vertical sliding of the platform. Although offset 16 is shown as fixed in length, interchangeable offsets 13 (FIG. 5) of differing thicknesses can be provided in order to modify the offset distance by raising a mounted rail. Accordingly, this disclosure is intended to cover interchangeable fixed length offsets as part of the disclosed invention. The offsets can comprise a shim or combination of shims placed directly under the rail.

Rail stops 14a, 16b protrude from the platform 12 in the form of a lip, raised ridge or textured surface to help retain the supported rails 50 when the rails are warped, cupped, or twisted.

Although not shown, a movable fence interlocking with the platform can also serve to secure the rail abutting the bracket flanges (bf). The fence can be adjustable to slide toward and away from the supported rail.

In the case of FIGS. 1-13 compressible member 24a, is a length of rubber channel adhered to the ends of arms 22, while FIGS. 14-16 show an embodiment in which compressible member 24b is a elastomeric button or bumper that is pushed through an aperture formed in the sides of arms 22 and positioned so that when the opening is fully seated against the fence pipe, the buttons decompress and apply force against the side rear of the fence pipe.

FIG. 5 shows the platform mounted to a fence pipe by pushing transversely wherein compressible members 24a are friction fitted to sides of the pipe 40. FIG. 6 is a side view that shows support, leveling and centering of rail 50 before fastening to bracket flange (bf).

FIGS. 7-9 show ridges 14b that are protruding from platform 12 which provide resistance to keep a supported rail from slipping off the platform. The offset between platform and the portion of offset 16 normally abutting fence pipe bracket 30 is designated (od).

FIGS. 10-13 show a supplemental elastomeric strap 27 removably affixed at each end to strap retention portions 25 that protrude in the sides of arms 22. While normally, a strap is not needed to retain the rail support to a fence pipe, there may be limited cases where the pipe is undersized and an additional cinching means is required.

While the embodiments depicted herein have one rail supporting surface, for standard milled lumber supplied in the nominal widths of 2.5 inches, 3.5 inches, and 3.75 inches, it is possible for offset 16 to extend from both sides of the platform with each extension having a different length. In this case, ribs 18 can be omitted, and the rail support flipped and thereby provide offsets for two different nominal widths. For example, a fixed offset of lesser length can center a 2.5 inch width rail relative to the most common pipe bracket, while an offset of greater length centers a 3.75 inch width rail.

While the invention has been described by the embodiments given, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus comprising:
    (1) a platform having a substantially planar top surface to temporarily support and retain at least a portion of a fence rail when the fence rail is rested unassisted thereon in a position adjacent flanges of a fence pipe mounted fence pipe bracket for fastening the fence rail to the flanges of the fence pipe bracket, and possessing an opening that is configured to freely admit and partially encircle a portion of the fence pipe when the platform opening is pushed transversely onto the fence pipe, whereby the platform supports the fence rail from below when the fence rail is rested thereon, and,
    (2) extending from the platform, resilient arms adjacent the opening wherein each arm has an end with a reversibly compressible member having portions that intrude slightly into the opening configured to extend just beyond the center point of the fence pipe when mounted thereon providing tension against the fence pipe to retain the platform in a position substantially perpendicular to the fence pipe, and,
    (3) a flexible strap moveable independently of the resilient arms, detachably coupled to one or more resilient arms and configured to span the distance between the ends of the resilient arms, that is readily attachable and detachable using fingers, to secure or release the temporarily mounted platform from the fence pipe.

2. The apparatus according to claim 1, wherein the platform possesses at least one protruding portion incorporated into or mountable to the top surface of the platform to keep a supported rail from slipping off the platform.

3. The apparatus according to claim 1 further comprising a gauging means for setting the distance from the fence bracket to the top surface of the platform which includes a fixed or adjustable projecting member of the platform.

4. A method of temporarily supporting, positioning, and affixing fence rails to flanges of a pipe bracket mounted on a fence pipe, comprising the steps of:
    (1) providing an attachable platform, a portion of which is shaped and sized to partially encircle a fence pipe, and portion of which has a fence rail supporting surface,
    (2) providing distancing means for offsetting the fence rail supporting surface from the pipe bracket flanges,
    (3) attaching the platform to the fence pipe by transversely pushing an opening of the platform onto the fence pipe to which it is frictionally retained, and, using a flexible strap connected to arms adjacent the opening to span the opening,
    (4) setting a portion of the fence rail atop the platform, and,
    (5) centering and fastening the fence rail to the fence pipe bracket, and,
    (6) removing the platform by decoupling an end of the flexible strap from an arm and transversely pulling the opening free of the fence pipe leaving the fence rail attached to the fence pipe bracket.

* * * * *